June 5, 1956   E. J. HEIZER ET AL   2,748,797
PNEUMATIC TIME-DELAY FUSE
Filed Nov. 8, 1951
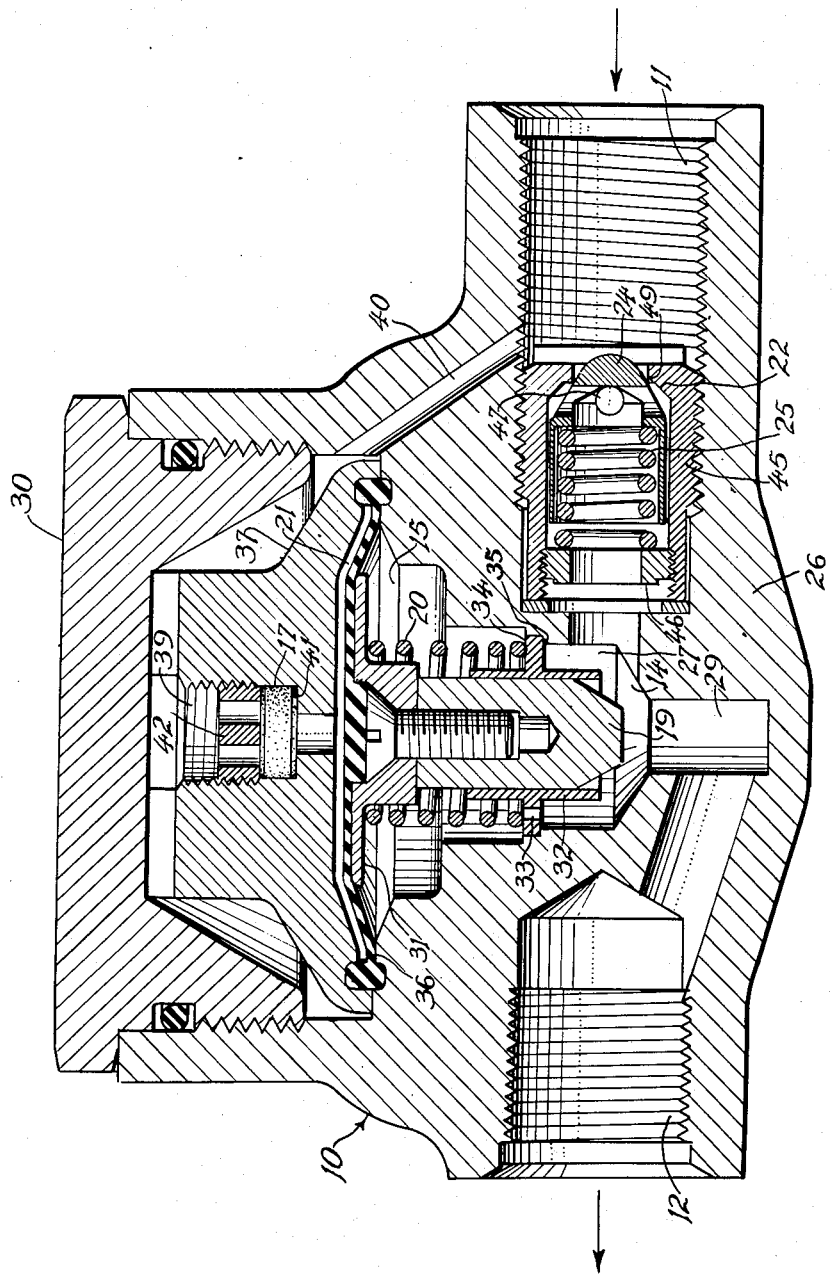
INVENTOR.
Edward J. Heizer
BY Wallis C. Axt
J. William Carson
ATTORNEY United States Patent Office
2,748,797
Patented June 5, 1956

2,748,797
PNEUMATIC TIME-DELAY FUSE

Edward J. Heizer, Mountain Lakes, and Wallis C. Axt, Upper Montclair, N. J., assignors to Specialties Development Corporation, Belleville, N. J., a corporation of New Jersey Application November 8, 1951, Serial No. 255,484

3 Claims. (Cl. 137—510)

The present invention relates to pneumatically controlled valves, and, more particularly, to such types of valves characterized herein as pneumatic time-delay fuses.

The present invention aims to provide such a valve which permits a surge of air of relatively short duration to pass therethrough for operating a pneumatic device downstream of the valve and permits air to flow therethrough at a relatively low predetermined rate due to permissible leakage in the line downstream of the valve, but which closes automatically in the event such flow persists at a rate greater than the predetermined permissible rate for more than a predetermined duration of time.

Accordingly, an object of the present invention is to provide an improved valve of the foregoing character which is simple and economical in construction and is reliable in operation.

Another object is to provide such a valve which readily responds even when the rate of flow permissible is exceeded slightly for a given duration of time.

A further object is to provide such a valve wherein the duration of time in which the valve responds to a greater than permissible flow can be accurately adjusted.

Other and further objects of the invention will be obvious upon an understanding of the illustrative embodiment about to be described, or will be indicated in the appended claims, and various advantages not referred to herein will occur to one skilled in the art upon employment of the invention in practice.

In the drawing, the single figure is a longitudinal sectional view of a pneumatic time-delay fuse embodying the present invention.

Referring to the drawing in detail, there is shown a pneumatic time-delay fuse which essentially comprises casing means 10 having an inlet 11 adapted for connection to a compressed air source, outlet 12, a main valve seat 14 formed with a port between the inlet and the outlet, a chamber 15 having its lower end in fluid flow communication with the seat port, and passageway means establishing fluid flow communication between the inlet 11 and the upper end of the chamber 15; flow restricting means 17 in the passageway means; a main valve member 19 for the main valve seat; resilient means 20 normally maintaining the main valve member off its seat; fluid pressure actuated means 21 in the chamber 15 arranged for effecting seating of the main valve member; and a poppet valve assembly between the inlet 11 and the main valve seat 14 including a seat 22 facing downstream of the inlet 11, a poppet valve member 24 for the seat 22, resilient means 25 for urging the poppet valve member 24 on its seat, and means permitting the flow of fluid from the inlet 11 to the outlet 12, as will be described hereinafter.

The casing means 10, as illustrated herein, comprises a body through which a passage extends including the inlet 11, a valve chamber 27, a port 29 through the main valve seat 14, and the outlet 12; and a plug 30 screw threaded into the open end of an upwardly facing stepped bore which provides the chambers 15 and 27.

The main valve 19 has an upper flange 31 and has its lower end slidably arranged in a sleeve 32 formed with a flange 34 supported on a shoulder 35 in the stepped bore of the casing body 26, the flange 34 being formed with openings 33 for establishing fluid flow communication between the lower end of the chamber 15 and the valve chamber 27 and the port 29. The resilient means 20 may be a cylindrical helical spring surrounding the main valve member 19 and having its upper and lower ends engaging the flanges 31 and 34, respectively, to maintain the main valve member off its seat 14.

The fluid pressure actuated means 21 may be a flexible diaphragm in operative contact with the upper end of the main valve member and secured in the chamber 15 between a shoulder 36 of the stepped casing body bore and a partition or retainer 37 held in place by the plug 30. The partition 37 has a central stepped bore 39 extending therethrough which has its lower end in communication with the chamber 15 and has its upper end in communication with a duct 40 between the inlet 11 and the casing body bore whereby a fluid flow communicating passageway is established between the inlet 11 and the upper end of the chamber 15.

The flow restricting means 17 preferably is a mass of porous compressible material seated on a shoulder 41 of the partition bore 39 and retained thereon by an apertured bushing 42 screw threaded into the upper end of the bore 39. The porosity of the mass 17 and the resulting flow rate of fluid therethrough can be controlled by adjusting the bushing to vary compression of the mass. For example, by increasing compression, the flow rate through the mass is decreased.

The poppet valve assembly preferably comprises a sleeve 45 threadedly secured in the casing body between the inlet 11 and the main valve seat 14, which sleeve is formed with the seat 22 and houses the valve member 24, the spring 25 and an annular bushing 46 threaded into the sleeve providing a seat for adjusting the compression of the spring 25. This poppet valve assembly is so constructed and arranged that a surge of air entering the inlet 11 will overcome the spring 25 and effect unseating of the poppet valve member 24, whereby this air will pass through a plurality of apertures 47 in the head of the member 24 and through the hollow body of this member, and will pass through the main valve chamber 27, the port 29 and the outlet 12 to the point of use.

In order to permit flow of air at a permissible predetermined relatively low rate through the poppet valve assembly, a small opening or vent is associated with the poppet valve member 24 and its seat 22. This may be accomplished by forming small V-shaped grooves 49 in the seat 22, each communicating with an aperture 47 when the member 24 is held on the seat 22, whereby the seat 22 and the member 24 form an imperfect seal for allowing fluid to flow therebetween. Alternatively, the head of the member 24 could be formed with such grooves or the member 24 or the sleeve 45 could be provided with one or more by-pass apertures of suitable cross-sectional area for accomplishing this function.

The pneumatic time-delay fuse illustrated and described herein is particularly adapted for use in a machine gun charger system wherein a piston is actuated by momentarily supplying compressed air at about 500 to 1000 pounds per square inch to operate the gun charger and set the bolt of the gun in motion again. Between operations of the gun charger, slight leakage of air may take place in the line downstream of the outlet 12 which is a normal condition in systems of this type and presents no problem. The vent grooves 49 of the poppet or shuttle valve are accordingly dimensioned to allow air to flow from the inlet 11 to the outlet 12 at the same rate of flow as the permissible leakage to thereby prevent a drop in pressure between the inlet 11 and the outlet 12. For example, air flow at the rate of about one quarter of a cubic foot per minute at 500 p. s. i. is considered a permissible leakage rate, the primary consideration being that the leakage rate permitted should not even remotely approach the capacity of the compressed air source.

While such leakage flow is being compensated by the poppet valve vent openings, air will not flow from the inlet 11 into the upper section of the chamber 15. However, should the leakage rate increase to say one cubic foot per minute and persist for about one minute, a pressure drop is established whereby sufficient air will pass through the flow restricting mass 17 and into the upper section of the chamber 15 to actuate the diaphragm and cause the same to move the main valve member 19 on its seat 14, thereby shutting off the flow of air from the inlet 11 to the outlet 12. Also, should a surge of air persist for a longer than desired duration, sufficient air enters the chamber 15 to effect actuation of the diaphragm 21 and seating of the main valve member 19 to thereby close the port 29 and prevent flow of air to the outlet 12.

As previously mentioned, the time interval required for the diaphragm to react can be controlled by adjusting the porosity of the mass 17. In order to provide for accurate time delay control, the spring 20 urges the main valve member 19 into an upper position so that the diaphragm 21 contacts the under surface of the partition 37 to eliminate an air space of variable volume while permissible leakage is taking place, although for clarity of illustration the diaphragm is not shown in such contacting position. In other words, prior to the downward movement of the diaphragm, the volume of the space between it and the partition is always the same, that is, substantially zero.

In view of the foregoing description, it will be seen that the present invention provides a simple, economical pneumatic time-delay fuse comprising a minimum number of parts which can be readily manufactured and assembled. The working parts are subjected to a minimum of wear and are not subject to destruction in the normal operation thereof, whereby repair and replacement of parts is eliminated. Also, the fuse is so constructed and arranged that the same functions in an accurate and reliable manner within the range of temperatures extending from —65° F. to 160° F.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. A pneumatic time delay fuse comprising a casing including a body formed with an inlet, an outlet, a main valve seat provided with a port between said inlet and said outlet, a stepped bore providing a shoulder and a chamber closed at one end and in fluid flow communication with said port at the other end thereof, and passageway means establishing fluid flow communication between said inlet and said chamber adjacent its closed end; partition means in said chamber on said shoulder having a bore therethrough; a flow restricting element in said last mentioned bore; a main valve member slideably supported in said chamber for engaging said main valve seat; a spring for normally urging said valve member off its seat; a diaphragm in said chamber between said partition means and said main valve member having its peripheral zone secured on said shoulder by said partition means and being arranged for effecting seating of said main valve member; and a poppet valve between said inlet and said main valve seat, said poppet valve including a seat facing downstream of said inlet, a poppet valve member for said poppet valve seat, spring means for urging said poppet valve member on its seat and adapted to yield in response to pressure of fluid entering said inlet at a predetermined rate, and means constituting contacting portions of said poppet valve member and its seat including a groove in one of said portions for permitting the flow of fluid from said inlet to said outlet at a much lower rate than the rate of flow to which said spring means will yield, the area of the diaphragm exposed to inlet pressure when the main valve is open being such that pressure acting thereon during leakage through said groove or during short surges of pressure in the inlet will be insufficient to overcome the main valve spring.

2. A fuse according to claim 1, wherein said stepped bore provides a second shoulder between said diaphragm and said port, and including a sleeve in said chamber having a flange seated on said second shoulder and formed with an opening for establishing the communication between said chamber and said port, said sleeve slideably supporting said main valve member, and a flange on said main valve member engaging said diaphragm, said spring being compressible between said flanges.

3. A fuse according to claim 1, wherein the closed end of said chamber is a closure removably secured to said casing and constructed and arranged to maintain said partition means on said shoulder.

References Cited in the file of this patent

UNITED STATES PATENTS

| | | |
|---|---|---|
| Re. 9,759 | Furney | June 14, 1881 |
| 842,279 | Walker | Jan. 29, 1907 |
| 1,035,803 | Mintz | Aug. 13, 1912 |
| 1,501,331 | Gulick | July 15, 1924 |
| 1,725,884 | Reichert | Aug. 27, 1929 |
| 2,025,076 | Spangler | Dec. 24, 1935 |
| 2,486,133 | Egger | Oct. 25, 1949 |